May 27, 1958 R. M. McNEILL 2,836,198
CONTROL VALVE

Filed Nov. 7, 1952 2 Sheets-Sheet 1

INVENTOR.
ROBERT M. McNEILL
BY
*G. William Freeman*
ATTORNEY

May 27, 1958 R. M. McNEILL 2,836,198
CONTROL VALVE
Filed Nov. 7, 1952 2 Sheets-Sheet 2
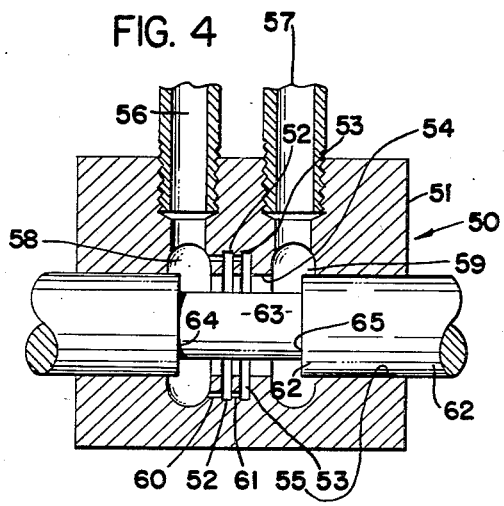
FIG. 4
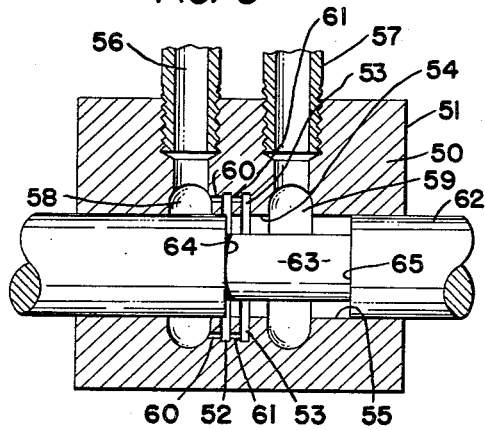
FIG. 5
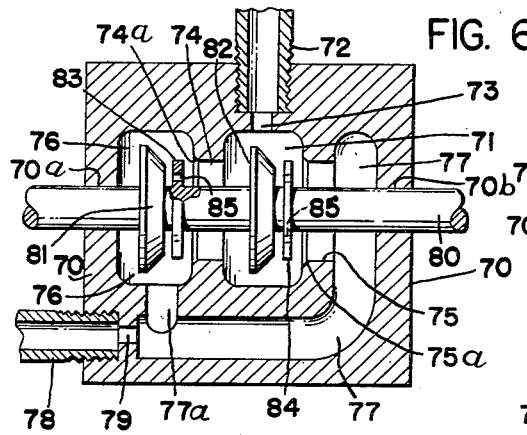
FIG. 6
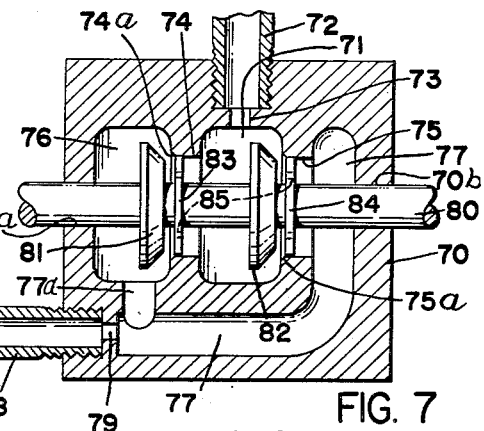
FIG. 7
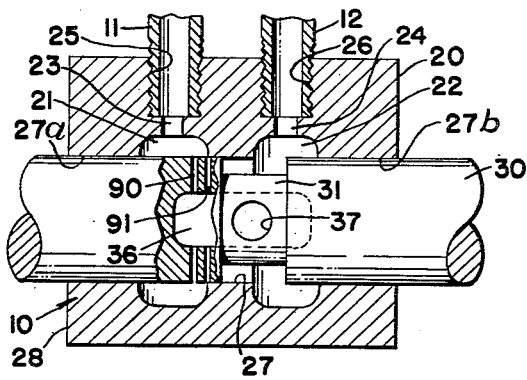
FIG. 8
FIG. 9
INVENTOR.
ROBERT M. McNEILL
BY
J. William Freeman
ATTORNEY United States Patent Office 2,836,198
Patented May 27, 1958

2,836,198

CONTROL VALVE

Robert M. McNeill, Jacksonville, Tex.

Application November 7, 1952, Serial No. 319,257

11 Claims. (Cl. 137—625.39)

This invention relates to control valves, and in particular relates to control valves of the type known as "balanced" slide valves.

Generally speaking, the "balanced" slide valve is employed to regulate the amount of flow through a fluid system. In essence, this type of unit provides a sliding shaft, movable between appropriate port openings, to open and close the unit to fluid flow. Actuation of the sliding shaft is accomplished by the application of varied types of externally controlled forces. Because all sliding valves, regardless of the type of external force applied thereto, operate to close the unit by gradually decreasing the area through which fluid may flow, it is manifest that certain dynamic pressures are set up under this type of operation. The net effect of these dynamic pressures is one of opposition to the closing of the sliding valve. This opposition increases as the valve approaches the closing position, and as an end result abnormal external pressure must be applied to the shaft to urge the same into a position of closure.

Several disadvantages are apparent from the foregoing. First, because of the relatively large pressure ultimately required to urge the shaft into closing position, the devices supplying the external pressure must be made unnecessarily large and cumbersome to provide the requisite force to close the valve. In applications where the shaft is actuated by external force controlled by diaphragm action, this difficulty becomes more disadvantageous because of the relatively large and cumbersome diaphragm required.

A second disadvantage arises by virtue of the fact that the external force used to return the shaft to the open position must necessarily be sufficient to overcome the force tending to maintain the same in closed position. Because this latter force is unnecessarily large for the reasons previously described, it follows that the force used to return the shaft to open position will also be unnecessarily large, thus resulting in a duplication of unnecessary forces.

Accordingly, it is one object of this invention to provide a sliding valve operable between open and closed positions upon the application of a relatively small amount of external force.

It is a further object of this invention to provide an auxiliary passage for diverting fluid flow as the valve approaches closing position, thereby rendering uniform the external pressure required to close the valve.

It is a further object of this invention to provide relief passages through which increasing amounts of fluid may be diverted as the valve approaches closing position.

It is a further object of this invention to provide a sliding valve having means thereon for permitting closure thereof upon the application of a substantially uniform and relatively low external pressure.

It is a further object of this invention to provide a sliding valve unit having means thereon to compensate for the increased resistance incident to closure.

It is a still further object of this invention to provide a simple and inexpensive device which may be incorporated on standard slide valves to accomplish the foregoing objects.

These and other objects of the invention will become more apparent upon consideration of the following brief specification, read in the light of the accompanying drawings.

Of the drawings:

Figures 4 and 5 are views illustrating a modified form of the invention in open and partially closed positions, respectively.

Figures 6 and 7 are views illustrating a modified form of the invention in open and partially closed positions, respectively.

Figure 8 illustrates a modified form of the invention in partly closed position.

Figure 9 illustrates a further modification of the invention in open position.

Figure 1:
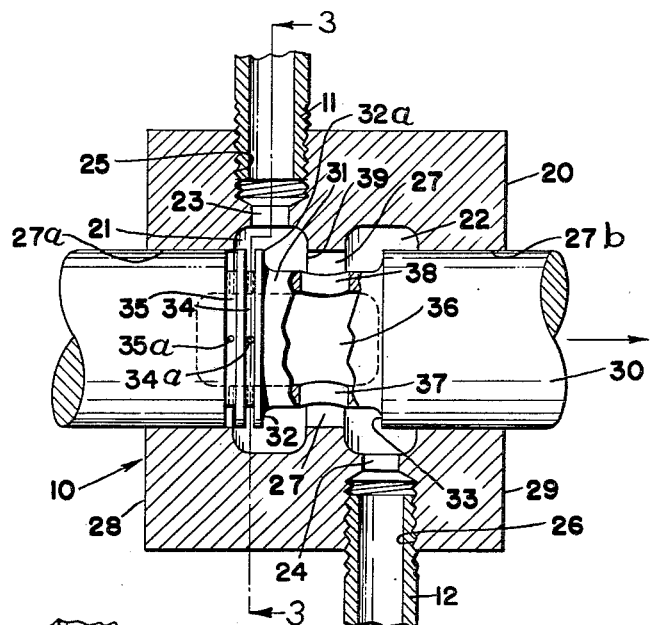
Figure 1 is a side elevation, partly broken away and in section and illustrating the preferred form of the improved sliding valve in open position.
Figures 2, 3:
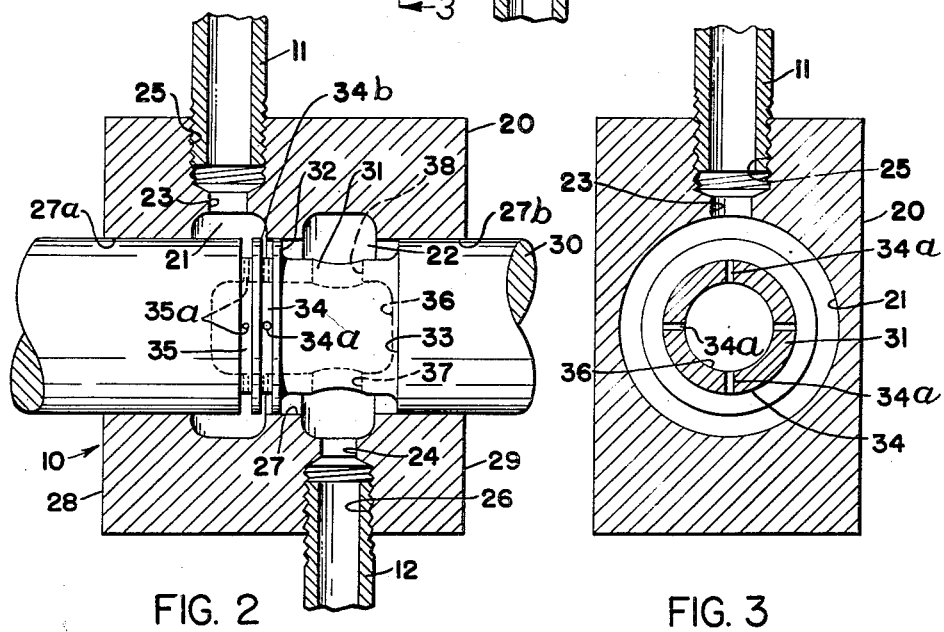
Figure 2 is a view similar to Figure 1 but showing the valve approaching closing position.
Figure 3 is a view taken on the chain-dotted line 3—3 of Figure 1.

Referring now to the drawings and in particular to Figures 1 and 2 thereof, the sliding valve unit, generally indicated as 10, is shown connected between a conduit 11 and a conduit 12 of a fluid system provided with external forces capable of actuating the mechanism of the sliding valve unit between the open and partially closed positions of Figures 1 and 2, respectively.

To the end of permitting fluid flow through the sliding valve unit 10 between the conduits 11 and 12, the body portion 20 thereof is shown including interior annular cavities 21 and 22, provided with appropriate port openings 23 and 24 communicating with threaded apertures 25 and 26 in which the conduits 11 and 12, respectively, are received. (See Figure 1.) Communication between the annular cavities 21 and 22 is facilitated by provision of a cylindrical land 27, aligned with respect to the cavities 21 and 22, and cooperating with aligned cylindrical recesses 27a, 27b of equal diameter so as to receive a shaft 30, the arrangement being such that recesses 27a and 27b communicate with the surfaces 28 and 29, respectively of the body 20.

Interruption of the fluid flow between the conduits 11 and 12 is facilitated for by provision of a cylindrical shaft 30, slidingly received in the recesses 27, 27a and 27b and including a reduced center portion 31 defined by shoulders 32 and 33. Annular grooves 34 and 35, located on the shaft 30 adjacent the shoulder 32 are provided with a plurality of port openings 34a, 34a, and 35a, 35a, connecting the bottom of said grooves 34, 35 with the interior of a cavity 36 provided interiorly of the shaft 30. Relatively larger ports 37, 38, provided between the reduced center portion 31 and the cavity 36 present a port of egress for fluid diverted into the cavity 36 in a manner to be described.

Movement of the shaft 30 from the position of Figure 1 to the position of Figure 2 is effectuated by the use of external forces, the details of which are not shown in view of the fact that any one of several types could be satisfactorily employed in conjunction with the improved shaft 30 without varying the construction or principle thereof.

In use or operation of the improved sliding valve unit 10, the same is shown in Figure 1 as interposed between conduits 11, 12 in the open condition. In this position the main portion of fluid entering the unit 10 through the conduit 11 will be directed into the cavity 21 through the ports 23 and hence into the cavity 22 through the area defined by land 27 and reduced portion 31, from which it will be directed to the conduit 12 through the port 24 (see Figure 1). For the purpose of maintaining a static balance of the shaft 30, it is apparent that a portion of the fluid entering through the port 23 may be directed into the cavity 36 through bleeder port 34a for subsequent emission into the chamber 22 through ports 37, 38. With regard to the quantitive amounts of fluid flow through the two passages just described, it is manifest that in the open condition of Figure 1, the majority of fluid will travel directly from the cavity 21 to the cavity 22 without going through the cavity 36 in view of the known fact that a fluid will follow the course of least resistance.

However, as the shaft 30 moves to the right under the influence of the external forces (not shown), the shoulder 32 approaches the juncture of the cavity 21 and the land 27 at a point designated as 39 (see Figure 1) and fluid flow is restricted between the point 39 and the point 32a of the shoulder 32. Further movement to the right causes a decrease in the distance between the points 39 and 32a, and accordingly causes an increase in the amount of resistance to fluid flow between points 39 and 32a. As the resistance increases, it is apparent that more and more fluid will be diverted through the ports 34a, 35a, thereby permitting a continuation of the shaft movement to the right without the attendant increase in the amount of external forces normally required to compensate for the increase in resistance between the points 39 and 32a. Just before the shaft 30 reached the position of Figure 2, it is manifest that substantially all of the flow will be through the ports 34a, 35a, the shoulder 32 having engaged the land 27. In this position the majority of fluid will flow through the port 34a because the same is shown slightly larger than 35a thereby offering a less resistance to fluid flow. In Figure 2, the majority of fluid is shown being diverted through the port 35a because of the restriction of the distance between point 39 and the sidewall 34b of the groove 34. Completion of movement to the right (not shown) results in cessation of flow between conduits 11 and 12, the last annular groove 35 being fully closed to flow by virtue of the engagement with the land 27.

When it is desired to open the system to flow, the direction of application of the external forces may be reversed and the shaft returned to the position of Figure 1. Subsequent closing of the fluid system would involve repetition of the above-described action.

In the foregoing description, certain features have been specifically described to make a full description of an operable device. For example, the ports 34a and 35a having been described as being of different size and the number of annular grooves provided has been shown to be two. Under the broad concept of permitting closure of the valve 30 by the application of an external force of uniform amount, it is apparent that the ports 34a and 35a could be identical and also that the number of grooves so provided could be reduced or increased dependent upon the particular problem involved.

From the foregoing it will be seen that there has been provided a new and novel type of sliding valve unit 10 wherein closure may be effectuated without the need of providing an excessive amount of external force normally employed to overcome the extreme resistance to closure found in conventional sliding valves.

The modification of the invention shown in Figures 4 and 5 in essence differs from the device shown in Figures 1, 2, and 3, in that the relief passages are provided in the body portion 51 of the unit 50 in the form of annular grooves 52 and 53 shown extending radially outwardly from the land 54 of the cylindrical recess 55. Normal fluid flow from the conduit 56 to the conduit 57 is facilitated by provision of annular cavities 58, and 59, the same being interconnected by the cylindrical recess 55 much in the same manner as described in connection with Figures 1, 2 and 3. Bleeder passages 60, 61 interconnect the groove 52 with cavity 58 and the groove 53 respectively for purposes to be described. In this regard a shaft 62 is shown slidingly received within the recess 55 and includes a centrally reduced portion 63 defined by shoulders 64 and 65. (See Figure 4.)

In use or operation of this modified form of the invention, fluid entering the unit 50 through conduit 56 is directed into the cavity 58, then into the cavity 59 through the recess 55 for subsequent emission through the conduit 57.

Upon movement of the shaft 62 towards the position of Figure 5, more and more fluid will be diverted into the bleeder passage 60 for alternative entrance to the recess 55 through groove 52 in view of the increased resistance to fluid flow between the shoulder 64 and the land 54 as previously described. As further movement to the right (Figure 5) continues, it is manifest that the groove 52 will become closed to fluid flow and all remaining fluid will be directed through the bleeder passages 60 and 61 into the groove 53 for entrance into the recess 55. As before, complete movement to the right will result in a complete shut off of fluid flow by closing off the groove 53.

In Figures 6 and 7, there is shown a modified form of the invention designed for use in conjunction with double-seated poppet valve installations. In this form of the invention, the valve body 70 is provided with an annular cavity 71 designed for communication with the conduit 72 through port 73, and being defined by land areas 74 and 75 which communicate with a second annular cavity 76 and a passage 77, respectively, the passage 77 being shown communicating with conduit 78 through a port 79. A second passage 77a is provided to permit a fluid passage between the cavity 76 and the passage 77, while the land areas 74 and 75 are shown chamfered as at 74a and 75a, respectively, to permit flush reception of the poppet valve heads 81 and 82 in a manner to be described.

The sliding shaft 80 is shown received in the body 70 through appropriate apertures 70a, 70b and is provided with the usual poppet valve heads 81 and 82, the same being spaced on the shaft so as to be movable within the cavities 76 and 71, respectively. Also provided on the shaft 80 may be disc shaped members 83 and 84, positioned in spaced relationship to the valve heads 81 and 82, respectively, and being provided with apertures 85, 85 therethrough for purposes to be described.

In operation of this form of the invention, fluid entering the open valve body 70 from conduit 72 passes through port 73 and enters cavities 71 and/or 76 for emission into the conduit 78 through passages 77, 77a and port 79. As the shaft 80 is moved to the right by the external forces operating thereon, more and more of the fluid is diverted through the apertures 85, 85 of the discs 83 and 84 until upon the valve heads 81 and 82 engage the chamfered surfaces 74a and 75a thereby completely shutting off fluid flow through the body 70.

The devices shown in Figures 8 and 9, respectively, are illustrative of modifications of the device of Figure 1 and relate to devices which omit the use of the grooves and bleeder passages, respectively, of Figure 1. Accordingly, like members designate like parts.

To this end in Figure 8, the shaft 30 is shown provided with bleeder passages 90, 91 defining a passageway between the cavity 21 and the cavity 36. Closure of the shaft 30 will be effectuated in the same manner as described in conjunction with the device of Figures 2 and 3, with more and more fluid being diverted through the passages 90, 91 as the shaft 30 is moved to the right.

By like token in Figure 9, the reduced portion 31 of the shaft 30 is shown provided with disc members 100, 101, the same being positioned on the reduced portion 31 at a spaced distance from the shoulders 32 and 33, and having apertures 103, 103 provided therein. (See Figure 9.)

In this form of the invention, wherein the use of an internal cavity within the shaft 30 is obviated, closure may be effectuated in the same manner as described in connection with Figures 1, 2 and 3, with more and more fluid being directed through the apertures 103, 103, as the shaft is moved to the right. With the shaft completely moved to the extreme right position, flow through the valve will be stopped as before.

Other modifications of the invention may be resorted to without departing from the broad spirit of this invention or the scope of the appended claims.

What is claimed is:

1. A valve mechanism of the character described, comprising; a valve body having an axial bore therein that includes an enlarged axial recess divided by a land area; inlet and outlet ports leading into said enlarged recess on opposite sides of said land area; a cylindrical shaft receivable in said bore in axially shiftable relationship therewith, and having an internal cavity that extends axially thereof between closed axial end walls; a second series of inlet and outlet ports communicating said cavity with the exterior of said shaft; and a third inlet port spaced axially from said second inlet port and communicating said cavity with the exterior of said shaft.

2. A valve mechanism of the character described, comprising; a valve body having an axial bore therein that includes an enlarged axial recess divided by a land area; inlet and outlet ports leading into said enlarged recess on opposite sides of said land area; a cylindrical shaft receivable in said bore in axially shiftable relationship therewith, and having an internal cavity that extends axially thereof between closed axial end walls; a second series of inlet and outlet ports communicating said cavity with the exterior of said shaft; and a third inlet port spaced axially from said second inlet port and communicating said cavity with the exterior of said shaft; said third-mentioned inlet port having a greater resistance to fluid flow therethrough than said second-mentioned inlet port.

3. A valve mechanism of the character described, comprising; a valve body having an axial bore therein that includes an enlarged axial recess divided by a land area; inlet and outlet ports leading into said enlarged recess on opposite sides of said land area; a cylindrical shaft receivable in said bore in axially shiftable relationship therewith, and having an internal cavity that extends axially thereof between closed axial end walls; a second series of inlet and outlet ports communicating said cavity with the exterior of said shaft; and a third inlet port spaced axially from said second inlet port and communicating said cavity with the exterior of said shaft; said second-mentioned inlet port being opposed to said second-mentioned outlet port.

4. A valve mechanism of the character described, comprising; a valve body having an axial bore therein that includes an enlarged axial recess divided by a land area; inlet and outlet ports leading into said enlarged recess on opposite sides of said land area; a cylindrical shaft receivable in said bore in axially shiftable relationship therewith, and having an internal cavity that extends axially thereof between closed axial end walls; a second series of inlet and outlet ports communicating said cavity with the exterior of said shaft; and a third inlet port spaced axially from said second inlet port and communicating said cavity with the exterior of said shaft; said second and third-mentioned ports being adaptable to positioning on opposed sides of said land area during closing of said valve, whereby fluid flow may be diverted through said third inlet port upon shifting of said shaft axially of said bore.

5. The device of claim 1 further characterized by the fact that said shaft includes at least one annular groove extending inwardly from the external surface of said shaft, and having a bottom wall; said secondary passage being defined by at least one passage connecting said internal cavity with the bottom wall of said groove.

6. A valve mechanism of the character described, comprising; a valve body having an axial bore therein that includes an enlarged axial recess divided by a land area; inlet and outlet ports leading into said enlarged recess on opposite sides of said land area; a cylindrical shaft receivable in said bore in axially shiftable relationship therewith; means on said shaft for progressively diminishing the amount of fluid flowing between said inlet and outlet ports of said valve body to the point where said flow through said valve body is terminated; said means including a primary passage and a secondary passage, each interconnecting said inlet and outlet ports of said valve body; a cut-off point defined by said land area; said cut-off point successively blocking off fluid flow through said primary and secondary passages upon unidirectional axial movement of said shaft, whereby said fluid first flows through said primary passage until said unidirectional movement of said shaft blocks said fluid flow through said primary passage, at which time fluid will be diverted into said secondary passage for flow therethrough until such time as continuation of said unidirectional movement causes flow through said secondary passage to be blocked; said shaft having a radially reduced axially extending length; at least one disc provided on said radially reduced length of said shaft and having the peripheral portion thereof concentric with the external surface of said shaft; said secondary passage being defined by an axially extending bore interconnecting opposed radial faces of said disc.

7. A valve mechanism of the character described, comprising; a valve body having an enlarged medial recess divided by a land area; inlet and outlet ports leading into said enlarged recess on opposite sides of said land area; an axial bore interconnecting opposed axial ends of said enlarged recess; a cylindrical shaft having a medially reduced portion and being reciprocal within said axial bore; a primary fluid passage interconnecting said inlet and outlet ports and being defined by said enlarged recess and said medially reduced portion of said shaft; a secondary fluid passage interconnecting said inlet and outlet ports and having a greater resistance to fluid flow therethrough than said primary fluid passage; and means for progressively diverting fluid flow from said primary passage to said secondary passage; said land area, said bore, and said shaft being of substantially equal diameter whereby unidirectional movement of said shaft in said bore will result in fluid flow through said primary passage being terminated upon contact of said shaft with said land area.

8. A valve mechanism of the character described, comprising; a valve body having an enlarged medial recess divided by a land area; inlet and outlet ports leading into said enlarged recess on opposite sides of said land area; an axial bore interconnecting opposed axial ends of said enlarged recess; a cylindrical shaft having a medially reduced portion and being reciprocal within said axial bore; a primary fluid passage interconnecting said inlet and outlet ports and being defined by said enlarged recess in said medially reduced portion of said shaft; a secondary fluid passage interconnecting said inlet and outlet ports and having a greater resistance to fluid flow therethrough than said primary fluid passage; and means for progressively diverting fluid flow from said primary passage to said secondary passage; said land area, said bore, and said shaft being of substantially equal diameter whereby uni-directional movement of said shaft in said bore will result in fluid flow through said primary passage being terminated upon contact of said shaft with said land area; said primary passage and said secondary passage both being open to fluid flow therethrough until said shaft contacts said land area, at which time fluid flow is through said secondary passage.

9. The device of claim 8, further characterized by the fact that continued uni-directional movement of said shaft results in said secondary passage being closed to fluid flow.

10. A valve mechanism of the character described comprising; a valve body having an axial bore therein that is defined by a pair of spaced enlarged recesses that define therebetween a land area, the diameter of which corresponds to the diameter of said bore; a cylindrical shaft having a reduced diameter central portion and being receivable in said bore in axially shiftable relationship therewith; inlet and outlet ports respectively leading into said enlarged recesses on opposite sides of said land area; a primary fluid passage defined by said enlarged recesses, said land area and said reduced diameter portion of said shaft; and a secondary fluid passage interconnecting said inlet and outlet ports; and means for progressively diminishing fluid flow through said valve body upon uni-directional movement of said shaft; said means including flow terminating means for said primary passage whereby fluid normally flowing through said primary passage enters said secondary passage until such time as said secondary passage is blocked off as a result of continued uni-directional movement of said shaft.

11. The device of claim 10 further characterized by the fact that the secondary passage is defined by axially spaced ports and annular grooves that are provided on said shaft.

References Cited in the file of this patent

UNITED STATES PATENTS

| | | |
|---|---|---|
| 430,089 | Sewall | June 10, 1890 |
| 696,329 | Green | Mar. 25, 1902 |
| 1,425,088 | Hayes | Aug. 8, 1922 |
| 1,597,747 | Slagle | July 13, 1926 |
| 1,701,716 | Brown | Feb. 12, 1929 |
| 1,730,322 | Gartin | Oct. 1, 1929 |
| 2,510,356 | Werts | June 6, 1951 |
| 2,651,511 | Glover Jr. et al. | Sept. 8, 1953 |
| 2,682,748 | Ernst | July 6, 1954 |

FOREIGN PATENTS

| | | |
|---|---|---|
| 1,388 | Netherlands | July 1, 1916 |
| 45,235 | France | Apr. 8, 1935 |

(Addition to Pat. No. 773,709)